Feb. 23, 1954
G. C. LINK
2,670,059
AUTOMATIC BRAKE ADJUSTER
Filed Sept. 29, 1951
2 Sheets-Sheet 1
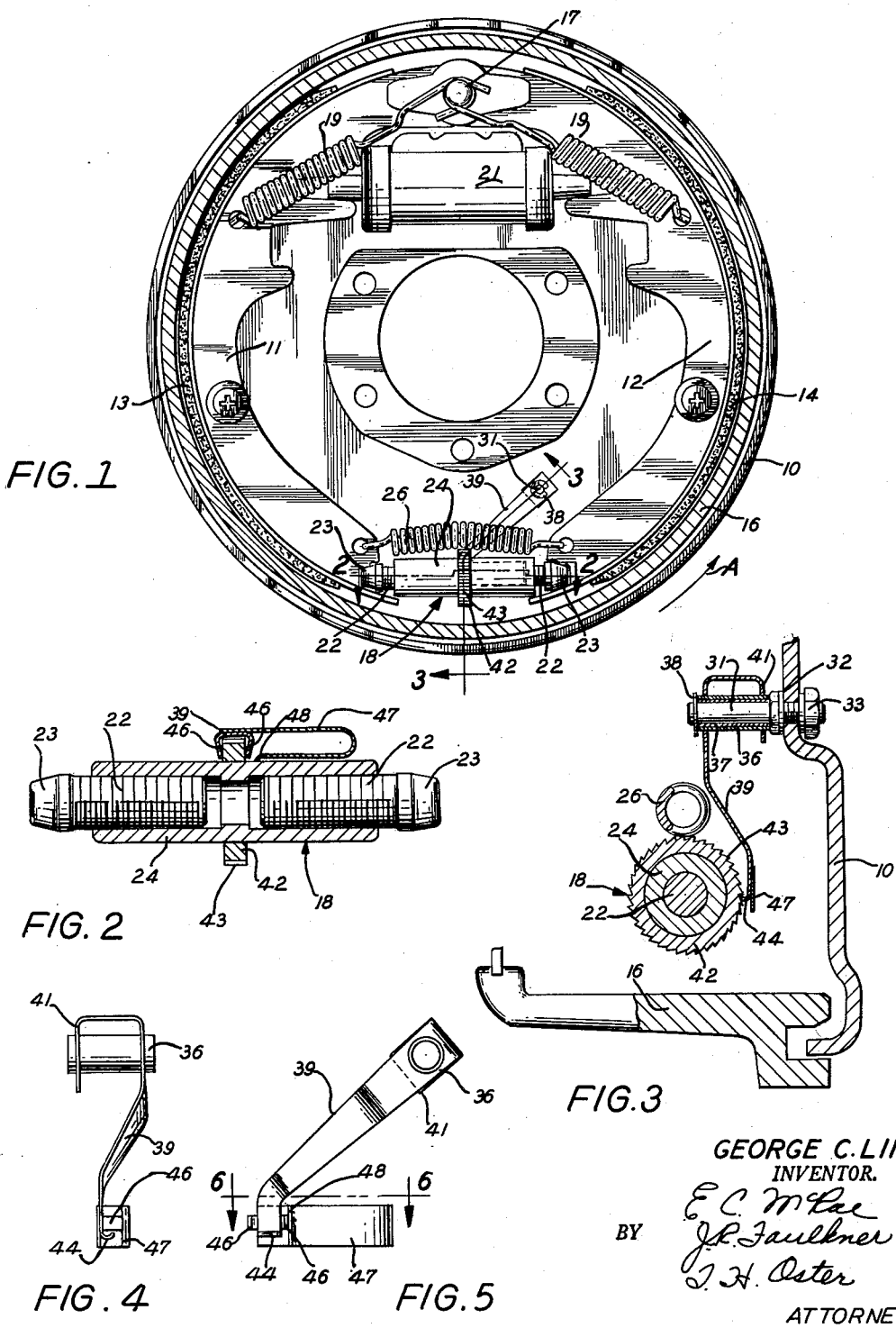
GEORGE C. LINK
INVENTOR.
BY E. C. McRae
J. R. Faulkner
T. H. Oster
ATTORNEYS Feb. 23, 1954          G. C. LINK          2,670,059

AUTOMATIC BRAKE ADJUSTER

Filed Sept. 29, 1951          2 Sheets-Sheet 2

GEORGE C. LINK
INVENTOR.

BY E. C. McRae
J. R. Faulkner
L. X. Oster
ATTORNEYS

Patented Feb. 23, 1954

2,670,059

UNITED STATES PATENT OFFICE 2,670,059

AUTOMATIC BRAKE ADJUSTER

George C. Link, Detroit, Mich., assignor to Ford Motor Company, Dearborn, Mich., a corporation of Delaware Application September 29, 1951, Serial No. 248,976

6 Claims. (Cl. 188—79.5)

This invention relates generally to wheel brakes for motor vehicles, and has particular reference to automatic brake adjusting means for such brakes.

It is an object of the present invention to provide relatively simple and inexpensive automatic brake adjusting means for vehicle brakes of internal expanding type. The device of the present invention may be applied to present vehicle brake designs without extensive modification of the brake structure.

A further object of the invention is to provide automatic brake adjusting means reliable in operation and entirely dependable. The device provides automatic adjustment in small increments when such adjustment is needed due to brake shoe wear, and means are provided for rendering the automatic adjusting means inoperative when the brakes are hot so as to prevent overadjustment.

Other objects and advantages of this invention will be made more apparent as this description proceeds, particularly when considered in connection with the accompanied drawings, wherein:

Figure 1 is an elevational view of the left front wheel brake of a motor vehicle.

Figure 2 is an enlarged cross-sectional view taken on the plane indicated by the line 2—2 of Figure 1.

Figure 3 is an enlarged cross-sectional view taken on the plane indicated on the line 3—3 of Figure 1.

Figure 4 is a side elevational view of a subassembly of the automatic brake adjuster.

Figure 5 is a side elevational view of the structure shown in Figure 4.

Figure 6:
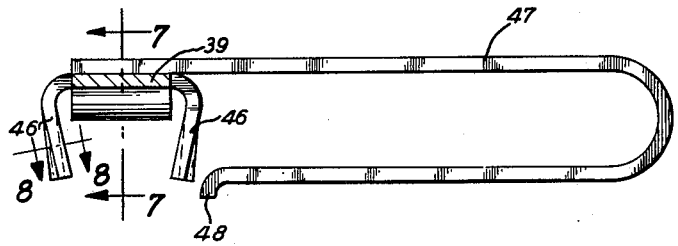
Figure 6 is an enlarged cross-sectional view taken on the plane indicated by the line 6—6 of Figure 5.
Figure 7:
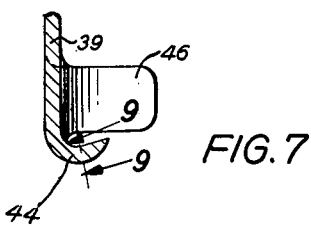
Figure 8:

Figures 7 and 8 are enlarged cross-sectional views taken on the lines 7—7 and 8—8 of Figure 6.

Figure 9:
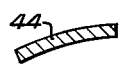

Figure 9 is an enlarged cross-sectional view taken on the plane indicated by the line 9—9 of Figure 7.

Figures 10, 11:
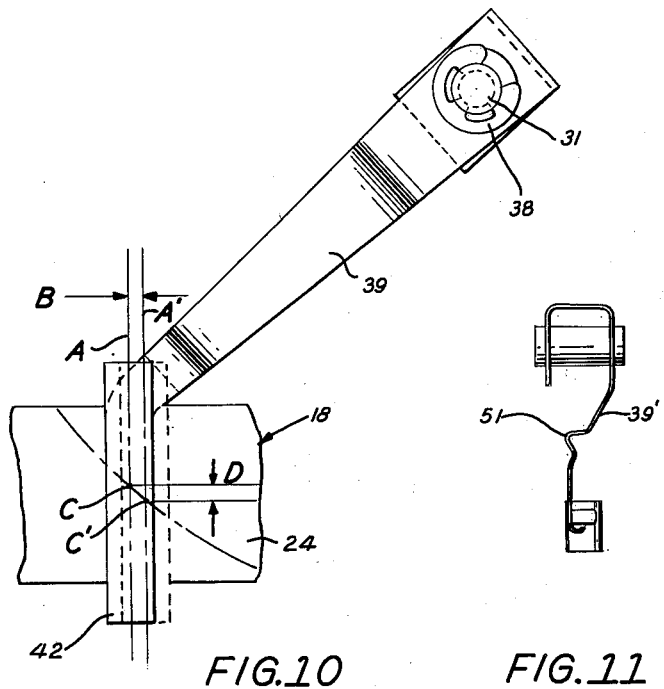

Figure 10 is an elevational view of a portion of Figure 1, on enlarged scale, showing the positions of certain of the parts before and after brake application.

Figure 11 is a side elevational view similar to to Figure 4, but showing a modification.

Referring now to the drawings, and particularly to Figure 1, the reference character 10 indicates the backing plate supporting the brake mechanism for the left front wheel. Brake shoes 11 and 12 are supported upon the backing plate and carry brake linings 13 and 14 adapted to engage the internal surface of the brake drum 16.

The brake mechanism is of the self energizing or floating type and is provided with an anchor 17 carried by the backing plate 10 and located between the upper ends of the brake shoes 11 and 12, and with a floating extensible connection 18 adjustably interconnecting the lower ends of the brake shoes. A pair of return springs 19 yieldably hold the upper ends of the brake shoes 11 and 12 in engagement with the anchor 17, except when the upper ends of the shoes are spread apart by the conventional hydraulic wheel cylinder 21, and serve to return the shoes to their anchored positions when the hydraulic pressure is released.

The floating extensible connection 18 comprises a pair of brake adjusting screws 22 each having clevis type ends 23 embracing the webs of the brake shoes adjacent the ends thereof. An internally threaded elongated brake adjusting nut 24 receives the threaded ends of the brake adjusting screws 22. The screws 22 are oppositely threaded, and it will be seen that rotation of the nut 24 in one direction is effective to lengthen the extensible connection 18 and spread the lower ends of the brake shoes apart. A return coil spring 26 has its opposite ends connected to the lower ends of the brake shoes 11 and 12 respectively, and serves to hold these shoes in engagement with the clevis ends 23 of the brake adjusting screws 22. The brake mechanism thus far described is conventional.

With the brakes at rest, a clearance is provided between the linings 13 and 14 of the brake shoes and the adjacent brake drum 16. Upon application of the brakes, the hydraulic wheel cylinder assembly 21 is effective to spread the upper ends of the brake shoes into engagement with the brake drum. With the car traveling in forward direction and with the direction of rotation of the drum being counterclockwise as shown by the arrow "A" in Figure 1, the leading brake shoe 11 becomes self energized and is carried in a counterclockwise direction by the drum. The energized force of the leading brake shoe 11 is transmitted through the floating connection 18 to the trailing brake shoe 12, urging it into engagement with the drum and causing the latter to wrap with the drum in a counterclockwise direction into engagement with the anchor 17. It will be noted that during this shifting of the brake shoes during brake application the extensible connection 18 is bodily moved to the right as shown in Figure 1. This movement is utilized in the present invention to actuate the automatic brake adjusting means.

As best seen in Figure 3, a mounting pin 31 is supported upon the backing plate 10. The mounting pin is provided with an integral flange 32 cooperating with a nut 33 on the threaded end of the pin to rigidly mount the pin upon the backing plate. To insure proper alignment of the pin 31, the outer surface of the backing plate is spotfaced to provide a flat surface. A sleeve 36 is rotatably mounted upon the pin 31 by means of an anti-friction bushing 37. The sleeve 36 is held against axial displacement by means of a retaining ring 38 seated in an angular groove formed near the end of the pin. The sleeve 36 supports a pawl 39 having a return bent flange 41. The body portion of the pawl 39 and the return bent flange 41 are provided with aligned apertures for receiving the sleeve 36, which is securely welded to the pawl. The sub-assembly of pawl and sleeve is shown in Figure 4.

The pawl 39 is arranged to actuate the brake adjusting nut 24, and for this purpose the brake adjusting nut carries an annular ratchet member 42 having inclined teeth 43 formed continuously around its periphery. As best seen in Figures 3 and 7, the lower end of the pawl 39 is formed with a hook-shaped marginal flange 44 having a sharpened end portion arranged to engage the teeth 43 of the ratchet 42.

At its lower end the pawl 39 is also provided with a pair of guide flanges 46 integrally formed therewith and adapted to embrace opposite sides of the annular ratchet member 42. These guide flanges are clearly shown in Figures 2 and 6, and it will be apparent that they serve to retain the lower end of the pawl in alignment with the ratchet even though the latter is shifted as the brake is applied. The guide flanges 46 are arcuate in cross section, as shown in Figure 8, to insure proper sliding engagement between the flanges and the ratchet regardless of the shifting of the latter and the resulting angular movement of the pawl.

Reference is now made to Figure 10 for an understanding of the operation of the structure thus far described. Figure 10 illustrates in full lines the position of the pawl and the ratchet 39 when the brake mechanism is in its retracted unapplied position. When the brake is applied, as previously mentioned, the brake shoes 11 and 12 and the floating connection 18 therebetween shift slightly in a counterclockwise direction as the brakes are moved into engagement with the drum. The magnitude of the shifting movement of the floating connection 18 depends upon the clearance between the linings of the brake shoes and the inner surface of the brake drum. As the brake is applied the lateral shifting of the adjusting nut 24 and the ratchet 42 carried thereby is accompanied by an angular movement of the pawl 39 about the pivotal axis formed by its mounting pin 31 by reason of the engagement of the pawl guide flanges 46 with the sides of the ratchet.

The vertical line A in Figure 10 represents the median plane of the ratchet 42 in the position it occupies when the brake is in its retracted position, while the vertical line A' represents the median plane of the ratchet after the latter has been laterally shifted a distance B upon application of the brake accompanied by the self wrapping effect referred to above. Point C represents the intersection of the sharpened edge of the lower marginal flange 44 of the pawl 39 with the median plane A, while C' represents the location of this intersection after the brakes are applied and the ratchet has shifted to the right the distance B. It will be noted that point C' is beneath point C a distance D. It will also be noted that point C moves on an arc whose center is the axis of the mounting pin 31 of the pawl 39 and consequently its vertical displacement bears a fixed relationship to the lateral displacement of the ratchet.

When the clearance between the brake shoes and the brake drum reaches a definite amount either from brake lining wear or from other causes, brake application will result in a sufficient downward movement of the point C of the pawl to enable the lip of the lower marginal flange 44 of the pawl to engage the next ratchet tooth. When the brakes are released and returned to their normal retracted position by the springs 19 and 26, the clockwise swinging movement of the pawl effects a rotation of the ratchet an amount equal to the distance between adjacent ratchet teeth. The ratchet being secured to the brake adjusting nut 24, this rotation results in spreading the brake adjusting screws 22 and the brake shoes engaged thereby, thus decreasing the clearance between the brake shoe linings and the brake drum. When, of course, the brake lining wear is insufficient to cause the pawl to move downwardly a distance equal to the distance between adjacent ratchet teeth, the ratchet remains stationary and no adjustment is made.

The return spring 26 between the lower ends of the brake shoe 11 and 12 engages the outer periphery of the ratchet 42 to prevent angular movement of the ratchet except under the actuation of the pawl. It will be apparent from the foregoing that the mechanism permits successive brake adjustments in small increments as required by brake lining wear to maintain the brakes in proper adjustment.

It is desirable to adjust brake shoes only when cold, since when the brake mechanism is hot the brake drum expands and an adjustment at this time would result in insufficient clearance being retained between the brake shoe lining and the drum when the latter cools. To prevent adjustment when the brake mechanism is hot, a thermostatic bimetal blade 47 is provided. Blade 47 is U-shaped and its longer leg is welded to the back surface of the lower extremity of the pawl 39, as best shown in Figures 2, 5 and 6, while the shorter leg of the blade is formed with a marginal flange 48 resting against the outer surface of the cylindrical brake adjusting nut 24.

Figure 2 shows the bimetal blade 47 in its normal position. When the brake mechanism becomes hot, the legs of the bimetal blade 47 are automatically spread apart and the lower end of the pawl 39 is moved radially of the ratchet 42 a distance sufficient to prevent engagement between the lip of the lower marginal flange 44 of the pawl and the ratchet teeth. Consequently, the automatic brake adjuster is rendered inoperative under such circumstances.

The modification shown in Figure 11 differs from the principal embodiment of the invention in that the body portion of the pawl 39' is provided with an integral looped part 51. Under normal operation of the automatic brake adjusting mechanism the pawl 39' operates in manner described above in connection with the principal embodiment, the looped part 51 being sufficiently stiff to insure rotation of the ratchet when adjustment is made. When, however, the brake is applied while the vehicle is traveling in reverse, so that drum rotation in the opposite direction and the self wrapping effect of the brake shoes causes the ratchet 42 to shift in the clockwise direction, the looped portion 51 of the pawl 39' extends and prevents undesired rotation of the ratchet and adjustment of the brake shoes.

It will be understood that the invention is not to be limited to the exact construction shown and described, but that various changes and modifications may be made without departing from the spirit and scope of the invention, as defined in the appended claims.

What is claimed is:

1. In a brake mechanism, a backing plate, a pair of internal brake shoes mounted upon said backing plate, an anchor on said backing plate engageable with one end of each of said brake shoes, a floating rotatably adjustable connection between the opposite ends of said brake shoes, a ratchet rotatable with said connection, and means for automatically rotating said connection and adjusting said brake shoes comprising a pawl having one end engageable with said ratchet and its opposite end pivotally mounted upon said backing plate at a point located radially inwardly of said brake shoes and circumferentially offset from the plane of said ratchet in the direction of forward rotation of said brake drum.

2. In a brake mechanism for braking a rotatable drum, a backing plate, a pair of internal brake shoes mounted upon said backing plate, an anchor on said backing plate engageable with one end of each of said brake shoes, a floating connection between the opposite ends of said brake shoes comprising a threaded member engageable with each of said brake shoes and a rotatable nut engaging and threadedly connected to each of said threaded members, an annular toothed ratchet carried by said nut, and a pawl pivotally mounted upon said backing plate with the pivotal axis of said pawl being spaced radially inwardly from the axis of said threaded members and offset circumferentially from said ratchet in the direction of forward rotation of said rotatable drum, and means carried by said pawl engageable with said toothed ratchet to rotate the latter and spread said threaded members to adjust said shoes upon a predetermined shifting movement of said floating connection.

3. The structure defined by claim 2 which is further characterized in that said last named means comprises a hook-shaped end adapted to engage the teeth on said annular ratchet, and guide flanges carried by said pawl embracing opposite sides of said annular ratchet to insure movement of the free end of the pawl with said floating connection.

4. In a brake mechanism for braking a rotatable drum, a backing plate, a pair of internal brake shoes mounted upon said backing plate, an anchor on said backing plate engageable with one end of each of said brake shoes, a pair of axially aligned threaded members engaging the opposite ends of said brake shoes, an elongated nut embracing and threadedly engaging said threaded members and adapted upon rotation to move said threaded members away from each other to adjust said brake shoes, an annular toothed ratchet carried by said elongated nut, a pivot pin extending at right angles to said backing plate and fixed thereto at a point laterally spaced from the plane of said angular toothed ratchet, a pawl having one end rotatably mounted upon said pivot pin, means at the opposite end of said pawl slidably embracing opposite sides of said toothed ratchet to effect swinging movement of said pawl about said pivot pin as said ratchet is circumferentially shifted during brake application, and a projection on said pawl adjacent said means engageable with the teeth on said ratchet to effect rotation of said toothed ratchet and said elongated nut to adjust said brake shoes upon a predetermined swinging movement of said pawl.

5. The structure defined by claim 4 which is further characterized in that a bimetallic member is secured to said pawl adjacent the free end of the latter and has a portion engageable with said elongated nut to disengage the projection on said pawl from the teeth on said ratchet when said brake mechanism reaches a predetermined temperature to prevent adjustment of said brake shoes when the brake mechanism is hot.

6. The structure defined by claim 4 which is further characterized in that said pawl has a yieldable portion permitting extension thereof during reverse rotation of the drum to prevent brake adjustment at this time.

GEORGE C. LINK.

References Cited in the file of this patent

UNITED STATES PATENTS

| Number | Name | Date |
|---|---|---|
| 1,875,065 | Lyman | Aug. 30, 1932 |
| 2,046,420 | LaBrie | July 7, 1936 |
| 2,057,847 | Sawtelle et al. | Oct. 20, 1936 |
| 2,095,753 | La Brie | Oct. 12, 1937 |

FOREIGN PATENTS

| Number | Country | Date |
|---|---|---|
| 766,811 | France | July 4, 1934 |